Dec. 12, 1944.   F. W. JOBE ET AL   2,364,793
EYE TESTING APPARATUS
Filed July 6, 1942   2 Sheets-Sheet 1

FREDERICK W. JOBE
HENRY W. TROST
INVENTORS

BY
ATTORNEYS

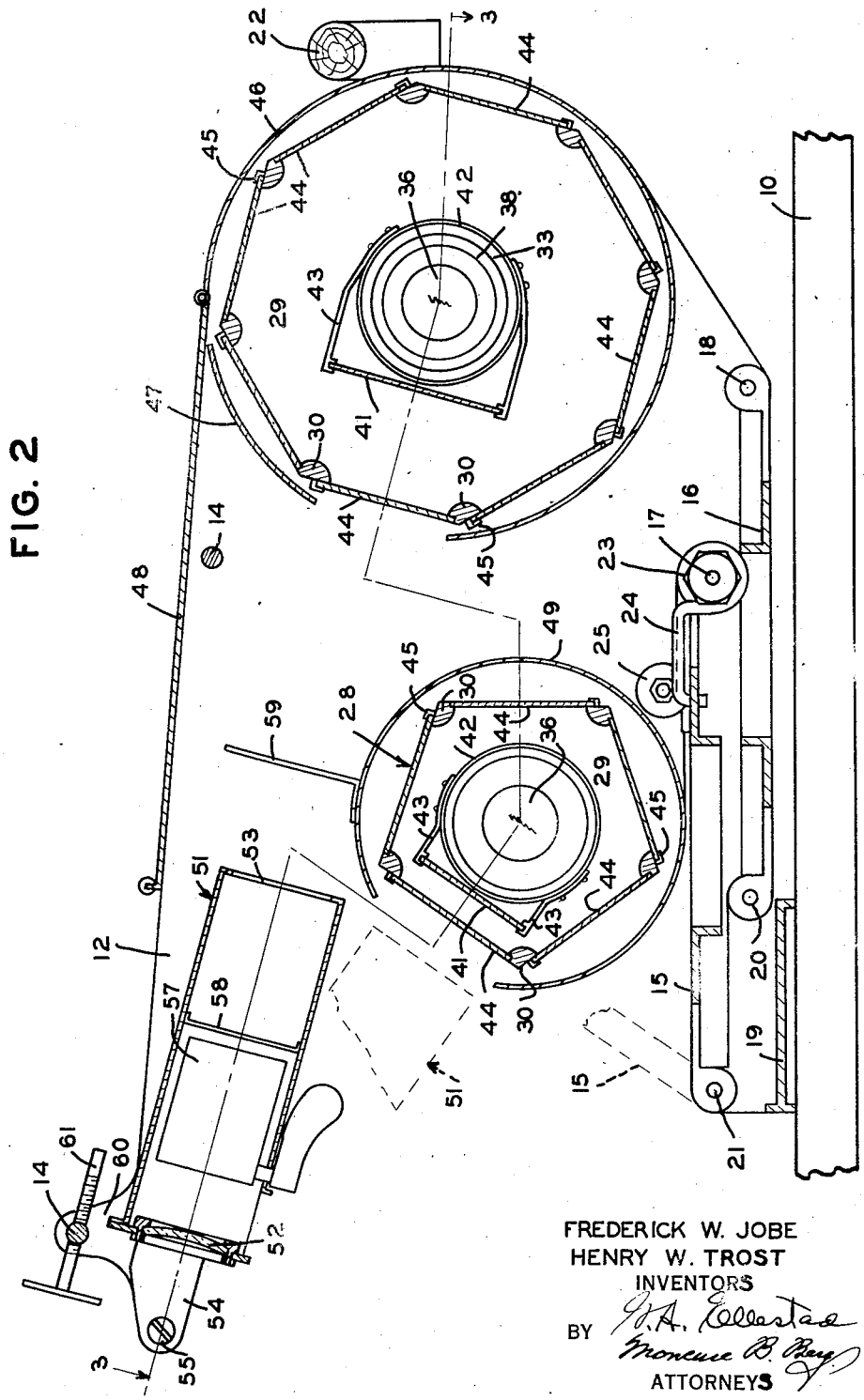

Patented Dec. 12, 1944

2,364,793

UNITED STATES PATENT OFFICE 2,364,793

EYE-TESTING APPARATUS

Frederick W. Jobe, Brighton, and Henry W. Trost, Rochester, N. Y., assignors to Bausch & Lomb Optical Company, Rochester, N. Y., a corporation of New York Application July 6, 1942, Serial No. 449,876

7 Claims. (Cl. 88—20)

Our invention relates to ophthalmic instruments and more especially has reference to eye testing apparatus.

One important object of the invention is to provide improved eye testing apparatus of simple design and construction which lends itself to facile operation. Another object resides in the provision of a novel instrument for carrying out visual classification tests under standardized test conditions. Yet another object is to provide means in a stereoscopic instrument for conducting far and near vision tests. A further object of our invention is the provision of an eye testing device having far vision testing means and near vision testing means located in elevated position with respect to each other and also having a pivoted light occluding box through which a person looks and which is adapted to be moved about its pivot and into selective alignment with either of said target means.

These and other objects and advantages reside in certain novel features of construction, arrangement and combination of parts as will be hereinafter more fully set forth and claimed.

To make the invention more clearly understood, we have shown means in the accompanying drawings for carrying the same into practical effect. In the drawings, wherein like reference numerals refer to similar parts throughout the several views:

Figure 2 is a longitudinal sectional view of the device shown in Figure 1.

Figure 1:
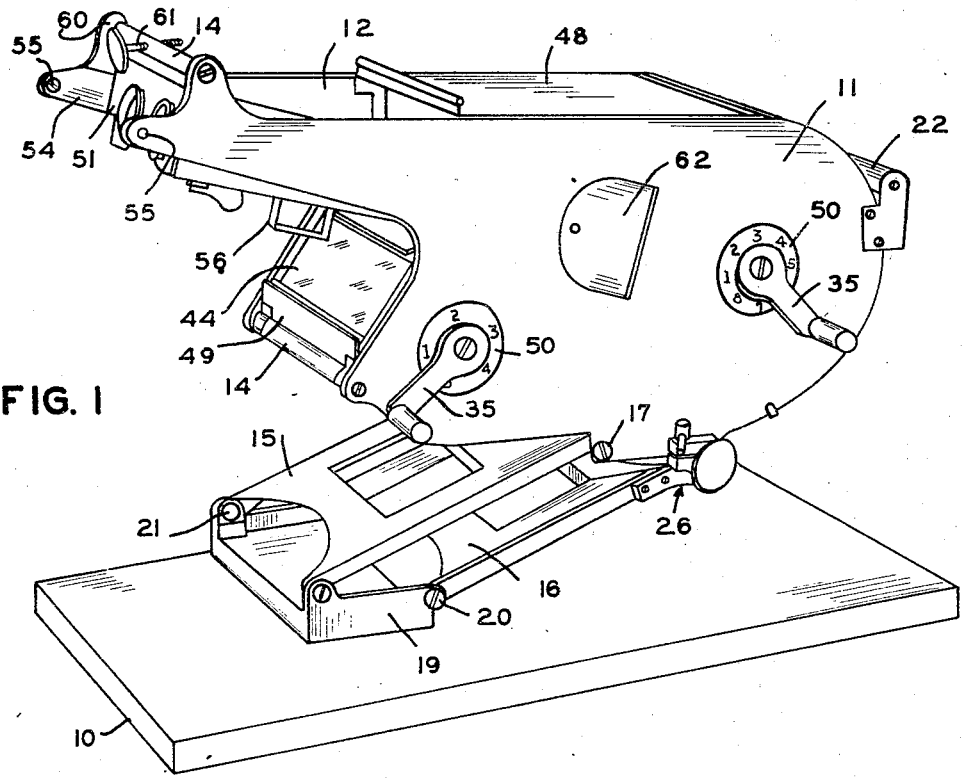
Figure 1 is a perspective view of our improved eye testing apparatus.

Visual classification tests are now employed to determine the work performance ability of students, factory and other workers, members of the armed forces and other groups of persons through their visual ratings. In conducting visual tests of this character, it is highly desirable that they be conducted under standardized conditions of, for example, illumination and distance.

Customary practice is to carry these tests to the group of persons to be tested so as to interfere as little as possible with their work and duties. Thus, similar tests of several groups of persons may be conducted in different parts of the same building or factory. Because of this, it will be apparent that the tests will generally be made in varied surroundings and under diversified circumstances. Obviously, conditions for standardized lighting will not be met when the tests are made in rooms which are differently illuminated. Also, under the circumstances noted, limitations on space may frequently be expected to prevent the standardization of the distance for testing far vision while the surroundings and means at hand which control the positioning or seating of a person for test purposes may preclude the maintenance of his eyes at the distance from the target preferred for near vision testing.

To overcome these difficulties, we have provided an eye testing instrument which permits testing while maintaining standardized conditions of observation by reason of the fact that these conditions are built into and made a part of the apparatus. A preferred form of our invention comprises a base 10 having a substantially flat support surface above which is carried a pair of similar support members or side frames 11 and 12 which are aligned with each other and which are connected in spaced apart and substantially parallel relation by tie rods 14 which extend between adjacent faces of the support members and are suitably secured thereto. This construction provides a housing space between the support members 11 and 12 within which there is mounted, as will be later described, far and near vision target means, light sources and a pivoted light occluding box adapted to be brought into alignment with either target means.

A pair of similar plates 15 and 16, each provided at its ends with aligned bosses, are employed in a parallelogram type of mounting for carrying the support members 11 and 12 above the base 10 so that the support members may be adjustably elevated with respect to the base. For this purpose, the plate 15 is pivoted or hinged between the support members 11 and 12 on aligned studs 17 which are carried at the lower side of each support member while the similar end of plate 16 is pivoted on studs 18 which are carried by each side member and are adjacent the studs 17. An anchor bracket 19, fixed on the top of base 10, carries studs 20 and 21 on which the second ends of plates 16 and 15 are respectively pivoted, the axes of studs 20 and 21 being substantially parallel with the surface of the base 10 and extending in a direction which is transverse of the side members 11 and 12.

The axes of the studs 17 and 18 are substantially perpendicular to the faces of the support members 11 and 12 and are spaced apart at a distance which is substantially equal to the spacing of the axes of the studs 20 and 21. As the elevating plates 15 and 16 are of substantially equal length, it may be noted that the axes of the studs 17 and 18 will be maintained in substantially parallel relation to the base 10 on movement of the elevating plates about their pivots 20 and 21.

The just described construction affords means for adjustably raising and lowering the support members 11 and 12, as well as the parts of the instrument which they carry, with respect to the base so that the device may be suitably positioned before the eyes of a person undergoing test. Thus, movement of the support members to the left or counterclockwise about pivots 20 and 21 as viewed in Figure 1, will elevate members 11 and 12 while reverse movement will lower them, a suitable handle 22 being provided at the back of the instrument to facilitate the elevational adjustment.

Means for balancing the members 11 and 12 in adjusted positions of elevation employ torsion springs. For this purpose, the end of each pivot stud 17 which extends into the housing space between the members 11 and 12 is threaded to receive an elongated nut 23 having a cylindrical shank and an enlarged head. A coiled spring 24 is slipped over the shank of each nut. One end of each spring 24 is bent and extends beyond the nut for engagement in an opening in the elevating plate 15 while the other end of each spring is bent and extends under a retaining member 25 secured to the support member to which the spring is adjacent.

While the balancing spring construction just described will normally retain the support members 11 and 12 in adjusted position, it is desirable to provide clamping means to prevent their accidental displacement as well as to facilitate the carrying of the instrument. A conventional clamp assembly of this character is illustrated in Figure 1 at 26 and comprises a drum element secured to an edge of plate 16 and a split band type of clamp which surrounds the drum and which is carried by the support member 11. The clamp is applied by drawing the ends of the band together by the use of a screw which extends through the split ends thereof and which is turned by a handle as shown in the drawings.

Figure 1 shows the instrument in an elevated position while in Figure 2 the instrument is lowered over the base 10. Suitable stops, not shown, are employed to limit the clock and counterclockwise movement of the support members on their pivots and to cushion the apparatus when it is moved to its lowermost position.

A pair of drums 27 and 28 are employed with the instrument for supporting a plurality of stereogram means in the form of transparent target slides suitable for eye testing purposes. These drums 27 and 28 are positioned between the side members 11 and 12 and are rotatable about axes which are transversely located with respect to the side members and which are substantially perpendicular to them.

Drum 27 carries target slides for testing far vision and is located at the back or rear of the instrument, that is to say, the end of the apparatus which is located most distantly from an observer or on the right as viewed in the various figures of the drawings. The axes of the drums 27 and 28 are spaced apart, one in front of the other and one over the other. Thus drum 28, used to carry near vision targets, is located to have its axis of rotation in front of and below the axis of the drum 27. By this construction, as will later appear, stereogram means in working position on one drum will be elevated with respect to stereogram means carried in a position for observation by the second drum.

Figure 3:
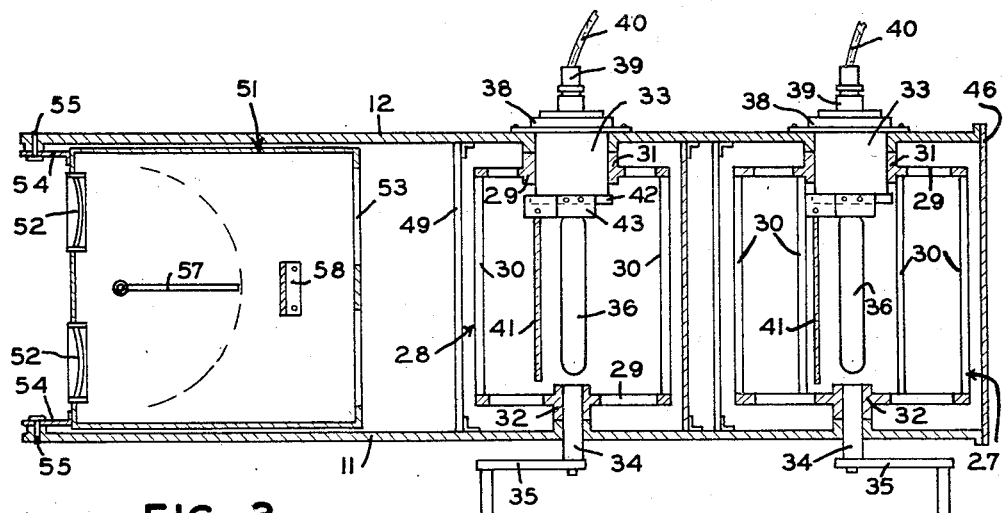
Figure 3 is a view on the line 3—3 of Figure 2 with parts of the instrument shown in section and parts thereof removed.

Drums 27 and 28 are of similar construction although of different size, the far vision drum having the larger diameter. With reference to Figures 2 and 3, each drum comprises a pair of spaced circular heads 29 which are aligned with each other and which are joined by spokes 30. One head 29 of each drum is provided with a hub 31 of relatively large diameter while the other head has a hub 32 of smaller diameter. These hubs permit the drums to be rotatably supported in the housing space of the instrument.

Each hub 31 is rotatable on a bushing 33 which extends through the support member 12 and has a flanged portion which is fixed to that member. On the other hand, each hub 32 is fixed to a stud shaft 34 rotatable in a boss in the wall of the support member 11. A crank 35 is provided on each shaft 34 and it will be apparent that actuation of the same will effect rotation of the drum with which the crank is associated.

A light source in the form of an electric bulb 36, preferably having a ribbon filament, is mounted within each drum 27 and 28 by similar means. These means adjustably support the usual bulb receptacle, not shown, in a cylindrical adapter 38, which latter is inserted and removably retained in the opening through a bushing 33 by a bayonet joint connection, not shown in the drawings. Each adapter 38 has one end which is closed except for an opening through which there extends a threaded adapter clamp 39 which engages the bulb receptacle and holds the same in desired position with respect to the adapter.

Loosening a clamp 39 allows a bulb receptacle to be rotated to a desired position with respect to its adapter 38 and to be locked in such position by tightening the clamp. This adjustment is made so that the filament of the bulb will be held in desired relation to the optical axis of the observation means of the instrument. For example, when a bulb with a ribbon filament is used, it is desirable that the filament be held so that its edges are substantially perpendicular to and are intersected by the optical axes of the lens means used to observe a target slide before that light source.

Each clamp 39 has a bore through which one end of electric cable 40 extends for connection with the bulb receptacle engaged to the clamp. The other end of each cable 40 is connected through switch means to a suitable source of electricity.

A separate diffusing screen 41 is mounted in front of each light source 36 and for this purpose each bushing 33 has a ring 42 secured thereto. Fixed to each ring 42, at substantially diametrically opposite positions, are a pair of relatively wide mounting members or brackets 43 between which a screen 41 is retained by the clamp means shown.

As intimated, each drum 27 and 28 is adapted to support a plurality of transparent target slides 44. Each slide 44 is of rectangular shape and is supported between a pair of adjacent spokes 30 of the drums. For this purpose, the spokes 30 on each drum are spaced at substantially equal distances from each other and are provided at least with end portions having a cross section such as shown in Figure 3.

As illustrated in Figure 3, one side of each spoke 30 has substantially flat seat means on which the long edge of a slide 44 is seated while the adjoining side of the same spoke is provided with lip means under which an adjacent slide 44 is engaged. Thus, each slide 44 has one long edge engaged with the lip means of a spoke 30 and its opposite edge seated on the flat seat means of a spoke which is adjacent to the first mentioned spoke. The slides 44 are removably retained in mounted position by a spring clip construction 45 carried on each spoke 30 to engage the edge of the slide which contacts the flat seat means. Suitable pins, not illustrated, are provided on the drum heads 29 to contact the short sides of each slide 44 and limit longitudinal movement of a mounted slide.

Each drum 27 and 28 has shield means partly around the same to shield the slides 44 from extraneous light. For example, the rear drum 27 is partially surrounded by a curved member 46 which is of circular shape and which extends transversely between the support members 11 and 12 to which it is secured. An extension member 47 of similar radius as the shield member 46 has one edge thereof fixed to a cover 48 which is hinged to the shield member 46 for movement about an axis which is transversely located with respect to the support members 11 and 12. Cover 48 is of a width to extend across the members 11 and 12 and when closed seats on these members and positions the extension member 47 so that it forms a continuation of the shield member 46.

The members 46 and 47 in effect provide a cylindrical casing having a display opening which extends transversely between the side members 11 and 12 and which has an area similar to that of a slide 44. This display opening between the shield members 46 and 47 is positioned in alignment with the observation means carried at the front of the instrument so that any target slide 44 aligned with the display opening may be observed, the plane of a slide before a display opening being substantially normal to the line of sight.

Besides serving to shield the line of sight from extraneous light, cover 48 provides means for permitting ready access to drum 27 for changing slides. When the cover 48 is opened, the extension member 47 is swung clear of the housing space between the support members 11 and 12. It is then merely a matter of rotating drum 27 to locate the slide to be changed in the most convenient position below the top of the side members 11 and 12 for effecting a change. On closing the cover 48, the extension member 47 is returned to its position for shielding the slides on the drum 27 from extraneous light.

Shield means 49 are provided around the front drum 28, these means being in the form of a one-piece casing member provided with a display opening which is adapted to be aligned with the observation means when the latter are in their position for testing near vision. Shield means 49 extend transversely between the support members 11 and 12 and are secured to these members. Drum 29 is located towards the front of the instrument and the faces of the support members 11 and 12 are thinned or reduced in width from the front end of the apparatus to a position in front of the near vision drum. This construction expedient leaves the display opening in the shield 49 unobstructed and permits easy access to the drum 29 for the purpose of changing target slides 44.

Suitable indicating means 50, carried on the side member 11 for each crank 35, may be employed to indicate by the position of each crank not only when a slide is located before a display opening but also which one of the slides is in working position.

For viewing the target slides, our invention makes use of a light occluding box 51 having a closed end provided with a pair of suitably spaced openings in each of which is mounted a similar lens 52. At the opposite end of box 51 are a pair of openings 53, each one of which is aligned with a lens 52. The openings 53 provide limiting aperture means for restricting the field of vision. Box 51 is mounted between the support members 11 and 12 in front of the target drum 28 and for this purpose has a pivot bracket 54 provided on each side of the box at the lens support end thereof. A pair of aligned pivot pins 55 extend through the reduced forward portion of the support members 11 and 12 in front of drum 28, one pin through each support member, and the brackets are pivotally mounted on these pins.

This construction permits the box 51 to be selectively aligned with either target carrying drum 27 or 28. An operating handle 56 is fixed to the bottom of box 51 for swinging the box about its pivots 55, any suitable friction means being provided for retaining the box in operating positions. It is to be noted that the pivot axis for box 51 is located adjacent to the front end of the instrument and is in front of the lenses 52. For this reason, the lenses 52 may be pivoted about an axis which lies in back of the corneas of the eyes of a person who is looking through the instrument.

Within the box 51 is a plate 57 mounted for pivotal movement about an axis which is on the longitudinal axis of the box and which is perpendicular to the top and bottom of the box. Plate 57 provides an occluder for covering either eye of a person using the instrument and through the use of a fingerpiece located below the box 51 may be turned on its pivot as indicated in the dotted line of Figure 3. Normally, the occluder is located centrally of the box as shown in the drawings.

To facilitate fusion of the stereogram target means, suitable septum means 58 and 59 in the form of plates are employed. Septum 58 is mounted within the box 51 with its width dimension extending transversely of the longitudinal axis of the box and comes into use in conjunction with the near vision targets carried on the drum 28. The other septum 59 is mounted on the shield 49 to also extend across the longitudinal axis of the box 51 when the latter is in alignment with a far vision target on drum 27.

The tie rod 14 nearest the front of the instrument is secured to upstanding ears 60 formed on the support members 11 and 12 so that it is elevated with respect to the box 51 and the lenses 52. An adjustable forehead rest 61 is mounted on the just mentioned tie rod and is also supported above the box 51. Adjustment of the forehead rest is towards and away from the forehead of an observer.

In operation, the instrument is placed near the edge of a table or other flat surface and the person to be tested is seated opposite the front end of the instrument. The instrument is then raised or lowered with respect to the base 10 until the lenses in box 51 are opposite the eyes of the observer who then places his forehead against the forehead rest 61 which is suitably adjusted for his forehead configuration. This locates the eyes of the observer in alignment with the lenses 52. By reason of the positioning of the axis through the pivots 55 at a suitable location in front of the lenses and also because of the adjustment of the head rest, the horizontal axis of rotation through the eyes of the observer will substantially coincide with the axis of the pivots.

The parallelogram type of mounting for the support members 11 and 12, it is to be noted, permits the various parts of the instrument to be maintained in substantially fixed relation to each other and at relatively constant angles of inclination to the base 10 regardless of the elevation of the support members. Thus, a line, which passes through the pivot axis 55 and through the axis of a target carrying drum at points on these axes equidistant from the support members 11 and 12, will always form a substantially constant angle with the plane of the base 10.

Assuming the instrument to be adjusted for an observer and the light sources illuminated, the far vision test is conducted with the box 51 in the full line position of Figure 2 wherein the box is aligned with the display opening in the light shield for the drum 27. A target slide 44 in alignment with the display opening may now be viewed.

The slides 44 are stereograms and those chosen for far vision tests have suitable targets for testing visual discrimination, stereopsis or depth perception, various phorias and also color vision. These slides 44 are selectively brought before the eyes of the observer by rotating the drum 27 to locate a desired slide in working position. In addition, the far vision test, and for that matter the near vision test, also checks binocular vision by the ability of the observer to fuse the targets on a stereogram. To assist testing, each support member 11 and 12 is provided with a door 62 through which a pointer may be inserted for indicating to an observer some portion or character on a slide 44 of the drum 27.

In conducting the near vision test, the box 51 is swung about its axis through the pivots 55 and into alignment with the operating slide 44 on the near vision drum 28 or into the position shown by the dotted lines in Figure 2. As the forehead rest 61 prevents the observer from tipping his head when the box 51 is positioned for the near vision test, the working slide on drum 28 can only be viewed by tipping or rolling the eyes downwardly. This movement of the eyes, as described, takes place about an axis which coincides with the pivot axis of the box 51. Hence, the distance from the eyes to the lenses 52 for the near point test will be substantially the same as that for the far vision test. Moreover, this distance will remain substantially constant for each observer even should he move his head away from the instrument and then retake an observation position.

With the eyes tipped downwardly as described, the near test is carried out in a manner such as that noted for the far test, similar types of stereograms being used for this purpose. However, testing for color vision does not form a part of the near vision test.

It is pointed out that the test distances remain substantially constant for each observer due to the construction of the instrument. The lens means 52 are employed to locate the test slides at the equivalent of some standard test distance from the eyes. This permits the test distance to be physically shortened so as to provide a relatively compact instrument. Under such practice, the drum 27 is located so that any slide 44 which it carries in a working position will lie substantially in the focal plane of the lenses 52 while drum 28 is located to carry a working slide in a position which is well inside the focal plane of the lenses.

The conditions of illumination of the target slides will remain substantially constant regardless of the character of the surroundings of the room or other place at which the instrument is set up for test purposes. This is because the support members 11 and 12, light shields 46 and 49 and cover 48 substantially prevent extraneous light from affecting the illumination of the working slides.

To carry the apparatus, a suitable box type of casing may be placed over the instrument support and detachably secured to the base 10.

From the foregoing, it will be appreciated that we have accomplished the aims and objects of our invention, in that we have provided an ophthalmic instrument which allows different persons under differently illuminated surroundings to be given vision tests under substantially standardized observation conditions. At the same time, we have incorporated in an instrument of this character a simple and compact design which lends itself to facile operation and ready transportation.

We claim:

1. An eye-testing apparatus having a base; support means carried by the base; a pair of target slides carried by said support means; means for illuminating said target slides; means through which said target slides are observed; means for pivotally mounting said observing means for selective alignment with either of said target slides; lens means carried within said observing means at one end thereof, the opposite end of said observing means being provided with aperture means to limit the field of vision, the pivotal axis of said observing means being substantially horizontal and located on the side of said lens means away from said target slides to pass substantially through the center of rotation of the eyes of a patient who is looking through said lens means, one of said target slides being located in an elevated position with respect to the other target slides and one of the target slides being located in front of the other target slides, one of said target slides disposed in a plane substantially coincident with the focal plane of the lens means when said observing means is aligned with that target slide, the other target slide being positioned to lie inside the focal plane of the lens means when the observing means is aligned with the last-mentioned target slide.

2. An eye-testing device comprising a pair of spaced support members arranged in substantially parallel relation; a pair of light shields in the form of casings which extend between and which are carried by said support members in positions wherein their longitudinal axes are transversely located with respect to said support members, one of said shields being located near one end of said support members and the second shield being located between said first shield and the opposite end of said support members, said shields being positioned to have their longitudinal axes lie one above the other, each shield being provided with a display opening located to face the same end of said support members; stereogram means supported within each shield in alignment with the opening therein; a light source supported within each shield for illuminating the stereogram means therein; a light occluding box supported between said support members at the end thereof faced by said display openings, the end of the box most distant from said shields being provided with sight openings through which a person may look to observe said stereogram means, the other end of said box being provided with aperture means to limit the field of vision; and means for pivotally supporting said box between said side members for swinging movement about an axis which extends substantially transversely of said support members and which is located on the side of said sight openings adjacent to the second end of said support members whereby to permit said sight openings to be selectively aligned with either of said display openings.

3. A device of the character described, comprising a base, support means carried by the base, a plurality of target slides carried by said support means, one of said target slides being elevated with respect to the second of said target slides and spaced to the rear of the first-mentioned target slide; viewing means pivotally supported on said support means for selective alignment with either the first or second-mentioned target slides on swinging the means about its pivotal axis, said means comprising a pair of sight openings through which a patient may look and provided with spaced aperture means for limiting the field of vision of the patient; lens means fixed in said sight openings of such a focal length that the rear target slide appears to a normal eye looking through said sight openings at the distance of the standard used for testing far vision and the other target means appears to a normal eye looking through a sight opening at the distance of the standard used for testing near vision, said viewing means being pivoted about an axis which is substantially perpendicular to the optical axes of said lens means and disposed in back of the corneas of the eyes of the patient looking through said lens means; and means for illuminating said target slides.

4. An eye-testing device comprising a support, viewing means including lens means carried by and at the front of said support, far-vision test objects carried at the rear of said support, near-vision test objects carried by said support intermediate the viewing means and the far-vision test objects and spaced below the latter, pivotal means mounting said viewing means to the support whereby the viewing means may be selectively moved into position for viewing the near-vision or far-vision test objects, the axis of said pivotal means being located forwardly of the viewing means and coinciding substantially with the horizontal axis of rotation of the eyes of an observer looking through the viewing means, the far-vision test objects lying at the focal plane of the lens means and the near-vision test objects lying between the lens means and said focal plane.

5. An eye-testing device comprising a support, viewing means carried by and at the front of said support, far-vision test objects carried at the rear of said support, near-vision test objects carried by said support intermediate the viewing means and the far-vision test objects and spaced below the latter, pivotal means mounting said viewing means to the support whereby the viewing means may be selectively moved into position for viewing the near-vision or far-vision test objects, said viewing means comprising a tubular box carrying spaced lenses at one side thereof and having an opening at the opposite side, and a septum positioned between the lenses and the opening, the far-vision test objects lying substantially in the focal planes of said lenses and the near-vision test objects lying between the lenses and the focal planes thereof when the viewing means is positioned in alignment with the respective test objects.

6. An eye-testing device comprising a support, a drum mounted at the rear of said support, a plurality of far-vision test objects carried by said drum, viewing means including lens means carried by said support at the forward part thereof, a second drum mounted on the support, a plurality of near-vision test objects carried by the second drum, the axis of the second drum being positioned forward of and below the axis of the first named drum, pivotal means for movably mounting the viewing means on the support whereby the viewing means may be selectively moved to one position for viewing the near-vision test objects or to another position for viewing the far-vision test objects, said drums being rotatably mounted whereby the test objects may be selectively brought into viewing position, the far-vision test objects lying at the focal plane of the lens means and the near-vision test objects lying between the lens means and said focal plane.

7. An eye-testing device comprising a support, a drum mounted at the rear of said support, a plurality of far-vision test objects carried by said support at the forward part thereof, a second drum mounted on the support, a plurality of near-vision test objects carried by the second drum, the axis of the second drum being positioned forward of and below the axis of the first named drum, pivotal means for movably mounting the viewing means on the support whereby the viewing means may be selectively moved to one position for viewing the near-vision test objects or to another position for viewing the far-vision test objects, said drums being rotatably mounted whereby the test objects may be selectively brought into viewing position, the axis of said pivotal means being located forwardly of the viewing means and rearwardly of the corneas of the eyes of an observer looking through the viewing means, said viewing means including optical means for optically locating the respective test objects at standard distances for making near-vision and far-vision tests.

FREDERICK W. JOBE.
HENRY W. TROST.